US010895450B2

(12) United States Patent
Lau et al.

(10) Patent No.: US 10,895,450 B2
(45) Date of Patent: Jan. 19, 2021

(54) SYSTEMS AND METHODS FOR GATHERING DATA AND INFORMATION ON SURFACE CHARACTERISTICS OF AN OBJECT (71) Applicant: AP Robotics, LLC, Rockville, MD (US)

(72) Inventors: Kam Chiu Lau, Potomac, MD (US); Guangkun Li, Woodstock, MD (US)

(*) Notice: Subject to any disclaimer, the term of this patent is extended or adjusted under 35 U.S.C. 154(b) by 0 days.

(21) Appl. No.: 16/173,816

(22) Filed: Oct. 29, 2018

(65) Prior Publication Data
US 2019/0128666 A1 May 2, 2019

Related U.S. Application Data (60) Provisional application No. 62/577,991, filed on Oct. 27, 2017.

(51) Int. Cl.
*G01B 11/25* (2006.01)

(52) U.S. Cl.
CPC ...... *G01B 11/2513* (2013.01); *G01B 11/2518* (2013.01); *G01B 11/2545* (2013.01)

(58) Field of Classification Search
CPC .................................. G01B 11/2513
See application file for complete search history.

(56) References Cited

U.S. PATENT DOCUMENTS

| 10,607,360 B2 * | 3/2020 | Matsuura | G06T 5/10 |
| 10,762,172 B2 * | 9/2020 | Hanina | G06T 7/246 |
| 2008/0138604 A1 * | 6/2008 | Kenney | G06K 7/12 |
| | | | 428/323 |
| 2010/0277702 A1 * | 11/2010 | Gollier | G02B 27/48 |
| | | | 353/81 |
| 2015/0253429 A1 * | 9/2015 | Dorrington | G01S 7/493 |
| | | | 356/5.01 |
| 2017/0164836 A1 * | 6/2017 | Krishnaswamy | G01B 11/2513 |

OTHER PUBLICATIONS

International Search Report, dated Dec. 31, 2018, PCT/US18/58002.

* cited by examiner

*Primary Examiner* — Irfan Habib
(74) *Attorney, Agent, or Firm* — Benesch, Friedlander, Coplan & Aronoff LLP (57) ABSTRACT

A system is provided for gathering information and data on the surface characteristics of an object includes a projector, a table, a first camera and a second camera. The projector is suspended above the table and arranged to project a random pattern of optical indicators onto the table. The optical indicators can be dots, lines, or other such indicators. The table is arranged to hold the object to be inspected. The first camera is positioned above and to one side of the table and angled toward the table. The second camera is positioned above and to opposite side of the table and angled toward the table. The first and second cameras are arranged to capture images of the optical indicators projected onto the object. The system is further arranged to gather information and data from the captured images and determine the surface characteristics of the object from said gathered information and data.

10 Claims, 7 Drawing Sheets

SYSTEMS AND METHODS FOR GATHERING DATA AND INFORMATION ON SURFACE CHARACTERISTICS OF AN OBJECT

CROSS-REFERENCE TO RELATED APPLICATION

This application claims priority to U.S. Provisional Patent Application Ser. No. 62/577,991, titled "System and Method for Gathering Data and Information on Surface Characteristics of an Object," which was filed on Oct. 27, 2017, which is expressly incorporated by reference herein in its entirety.

FIELD OF INVENTION

The present disclosure generally relates to systems and methods for gathering information and data for a calculation of surface contours, edges, and features of an object. More specifically, the present disclosure relates to systems and methods for projecting optical indicators onto the surface of an object and detecting such optical indicators from two or more points of view to calculate the surface contours, edges, and features of the object.

BACKGROUND

In many applications it is useful to accurately determine surface characteristics of an object. Such surface characteristics include the contours of the surface, the edges of the surface, and features of the surface such as holes, slots, and the like. With regard to contours of surfaces, the term refers to the shape of the surface, including curves, changes in elevation, sharp transitions, and the like. For features such as holes and slots, determining such features includes determining the location of the feature on the surface and the dimensions of the feature. Accurately determining such surface characteristics is useful and even critical in many commercial activities such as the manufacturing of many types of components and assemblies, the assembly of components into systems, inspection of the quality of components and systems, etc. Determination of surface characteristics is also important in industrial research and development, product development, and academic research.

In many manufacturing applications, the ability to reproducibly manufacture complex components is critical in manufacturing and assembling a quality product. When the components have complex surfaces, it is important to assure that these surfaces are manufactured according to specifications. For example, when dimensional tolerances are small, even minor deviations from the specifications can lead to mismatching or ill-fitting components during assembly of products. Such assurance is typically achieved through post-manufacturing inspections of components and assemblies. Typically, surface characteristics of a component are evaluated through visual inspection by a quality control employee. Such visual inspections can be done by simply visually comparing a surface of a component to a template or by placing that template in physical contact with the surface of the component. The quality control employee can then evaluate how closely the surface of the component matches to the template and make a judgement as to the quality of the component. In another method, the quality control employee can directly measure certain dimensions, features, and contours with measuring devices to evaluate the quality of the components.

As will be understood, the typical visual and manual inspection techniques employed by quality control employees can be time consuming and lead to inconsistent results. There is a need for improvements to existing techniques to provide for systems and methods for gathering information and data to accurately and precisely calculate the surface contours, edges, and features of an object.

SUMMARY

In one embodiment, a system for gathering information and data on the surface characteristics of an object includes a projector, a surface to support the object to be inspected, such as a table, a first camera, and a second camera. The projector is suspended above the table and arranged to project a random pattern of optical indicators onto the table. The optical indicators can be dots, lines, a combination of the two, or any other such indicators. The first camera is positioned above and to one side of the table and angled toward the table. The second camera is positioned above and to an opposite side of the table and angled toward the table. The first and second cameras are arranged to capture images of the optical indicators projected onto the object. The system is further arranged to gather information and data from the captured images and determine the surface characteristics of the object from said gathered information and data.

In another embodiment, a system for gathering information and data on the surface characteristics of an object includes a projector, an optical wedge, a surface to support the object to be inspected, such as a table, a first camera and a second camera. The projector is suspended above the table and arranged to project a random pattern of optical indicators onto the table. The optical wedge is positioned proximate to the projector in the field of projection. The wedge is arranged to refract the pattern projected from the projector, and further arranged to periodically rotate about the axis of the field of projection. The first camera is positioned above and to one side of the table and angled toward the table. The second camera is positioned above and to opposite side of the table and angled toward the table. The first and second cameras are arranged to capture images of the optical indicators projected onto the object as the optical wedge rotates. The system is further arranged to gather information and data from the captured images and determine the surface characteristics of the object from said gathered information and data.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for accurately gathering information and data on the surface characteristics of an object are hereinafter disclosed and described in detail with reference made to FIGS. 1-7.

Figure 1:
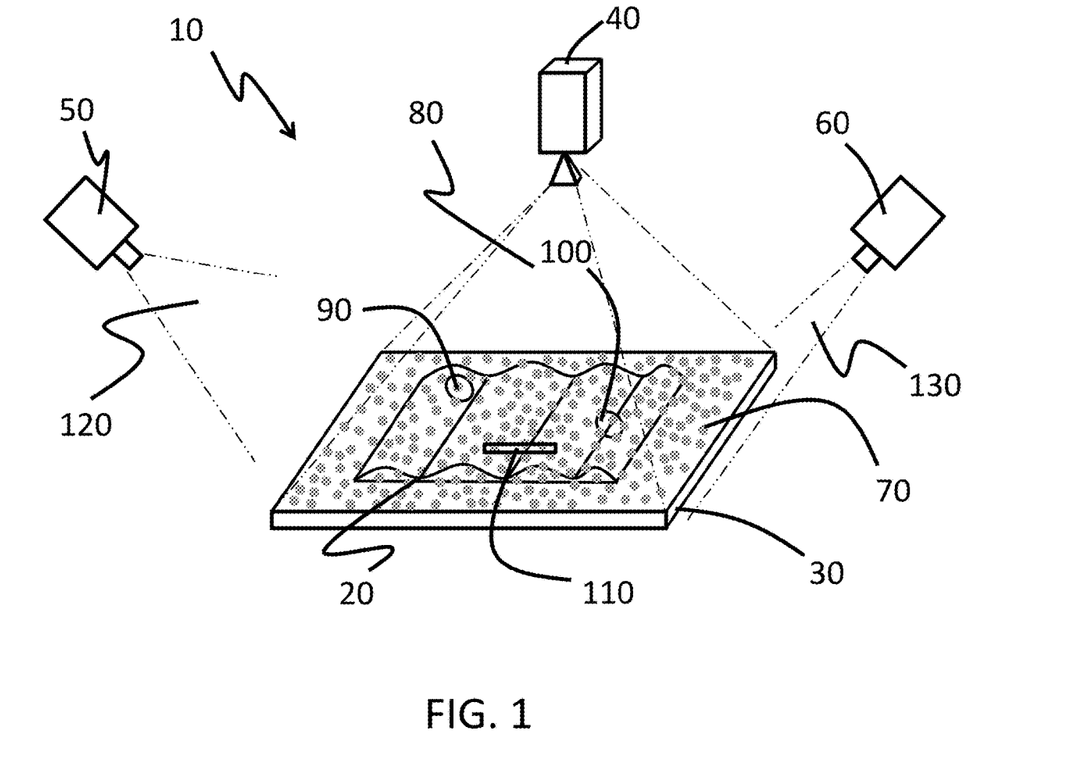
FIG. 1 schematically illustrates a perspective view of an exemplary system for gathering information and data on the surface characteristics of an object using generally circular optical indicators.

FIG. 1 schematically illustrates a perspective view of a system 10 for gathering information and data on surface characteristics of an object 20. The system 10 includes a surface to support the object such as a table 30, a projector 40, a first camera 50, and a second camera 60. The projector 40 is positioned directly above the table 30 and projects a series of randomly positioned optical indicators, such as generally circular dots 70, that are displayed onto the table 30. As will be understood, when an object 20 is placed on the table 30, a plurality of dots 70 will be projected onto and displayed on the object 20. The field of projection 80 of the projector 40 is sufficiently wide for dots 70 to be projected on all areas of the table 30. In the system 10 illustrated in FIG. 1, a central axis (not illustrated) passing through the field of projection 80 is perpendicular to the table 30. It will be understood that in such an arrangement, optical indicators, such as dots 70, are projected onto the table 30 without any substantial distortion due to angle of projection. As will be further understood, if the central axis of the field of projection is at an angle to the table, dots projected onto the table would experience some distortion (i.e., appearing oval or otherwise oblong). However, it will be understood that such angle and distortion can be taken into consideration in any algorithms and methods described herein. Throughout this disclosure, optical indicators are illustrated with certain arrangements and spacing; however, it will be understood that such illustrations are presented in a non-limiting manner and presented so that the systems and methods can be understood. Alternative arrangements and spacing for projected optical indicators are also contemplated herein and are a part of this disclosure.

As is illustrated in FIG. 1, the surface of the object 20 is contoured, and, for demonstration purposes, the object 20 includes a number of features, including a pair of holes 90, 100 and a slot 110. The first camera 50 is positioned above and to one side of the table 30, and the second camera 60 is positioned above and to the opposite side of the table 30. The first and second cameras 50, 60 are angled down toward the table 30 so that the field of view 120 of the first camera 50 captures the entire table 30 and the field of view 130 of the second camera 60 also captures the entire table 30.

Figure 2:
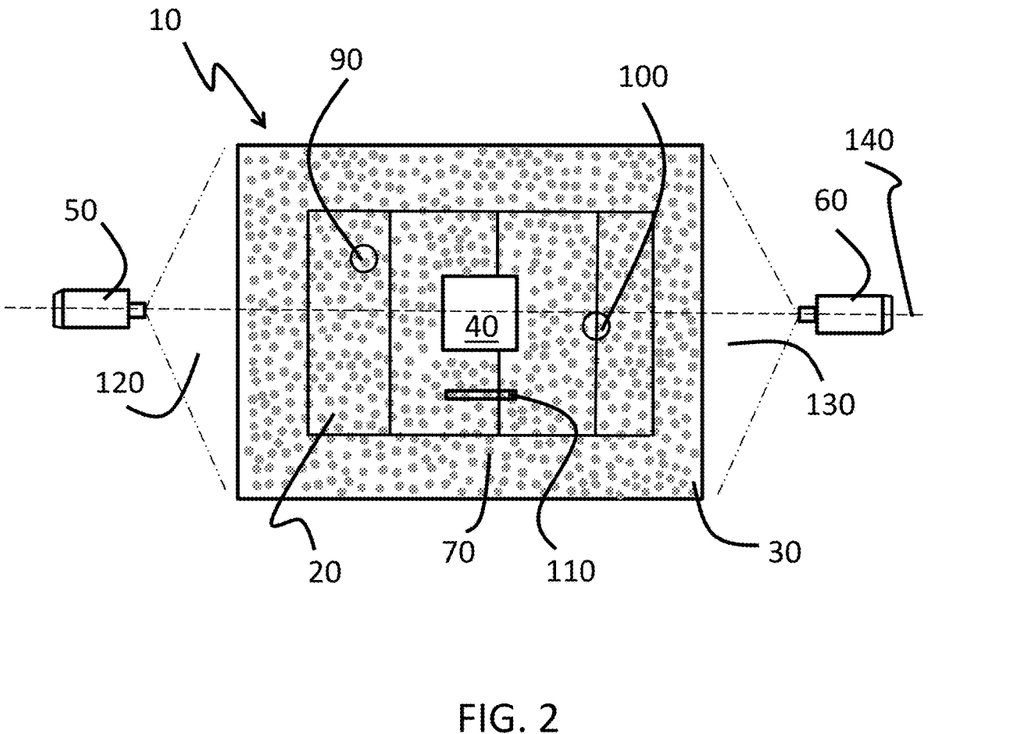
FIG. 2 schematically illustrates a top view of the system of FIG. 1.

When a random series of circular dots 70 is projected onto the object 20, the first camera 50 can be arranged to capture a first image of the object 20 from a first point of view, and the second camera 60 can be arranged to capture a second image of the object 20 from a second point of view. FIG. 2 is a schematic illustration of the system 10 as viewed from directly above the system 10. As is illustrated, the first and second camera 50, 60 and the projector 40 are aligned collinearly along a line 140. Also, as illustrated in FIG. 1, the first and second cameras 50, 60 can be positioned the same distance above and laterally spaced from the table 30 and arranged at the same (but opposite) angle toward the table 30. Therefore, it will be understood that the first point of view from the first camera 50 is directly opposite the second point of view from the second camera 60. While the system 10 illustrated in FIG. 1 depicted the first and second cameras 50, 60 and the projector 40 as collinear and the first and second cameras 50, 60 as positioned the same distance above and laterally spaced (i.e. at same but opposite angle) with regard to the table 30, other arrangements of components are contemplated as well. The first and second cameras 50, 60 can be positioned at different distances from and at different angles to the table 30. However, in each arrangement, the projector 40 projects optical indicators onto the object 20 and a pair of cameras capture images of the optical indicators from two different perspectives.

Once the first image is captured by the first camera 50 and the second image is captured by the second camera 60, the two images can be analyzed to determine the surface characteristics of the object 20. The process of analyzing the first and second images is facilitated by the use of algorithms and other methods embodied in software code and operating on a server, computer, or other computing device. The process of analyzing the first image and second image begins by identifying individual dots in both the first image and second image. The random pattern of the dots 70 assists in identifying each individual dot 70. A pattern of several dots can be identified in the first image and that same pattern can be identified in the second image. Thus, the corresponding dots of the identified pattern in the first and second images can be paired and considered the same dot. Through a process of identifying many patterns in both the first and second images, each dot projected onto the object can be identified in both the first and the second images. Once each dot is identified in the first and second image, the two images of the dot can be compared to assist in determining surface characteristics of the object.

Although methods of determining surface characteristics as described herein rely primarily on the projection of random optical indicators on the object to be inspected, additional data and information may be used by such methods. For example, due to the arrangement of the system 10, a number of "known" factors can be used in cooperation with the data and information gathered from the first and second images to determine the surface characteristics of the object. For example, the positioning of the projector 40 is known, the characteristics of the projected dots 70 is known, and the position of the first and second cameras 50, 60 are known. This is to say, the size of a dot as projected from the projector 40 is known (and thus, the size of the dot projected at each incremental distance from the projector is known), the distance from the projector 40 to the table 30 is known, the first camera's 50 distance and angle with respect to the table 30 is known, and the second camera's 60 distance and angle with respect to the table 30 is known.

With this list of known factors combined with the shape and position of each dot as it appears on the first image and the second image, the surface characteristics of the object can be determined. In one example, if only a portion of a dot is captured by the first and second image, it can be determined that the dot spans an edge of the object or the edge of a feature of the object 20, such as the edge of a hole or slot. In another example, if a dot as captured by the first and second image is non-circular in shape, i.e., oval or otherwise oblong, it can be determined that the dot is projected on a surface of the object that is angled relative to the surface of the table. By taking into consideration the projected size of the circular dot, the distance of the projector to the table, and the distance and angle of the first and second cameras 50, 60, the contour of the surface of the object at the point at which the dot is projected can be determined. As will be understood, evaluating numerous dots, particularly numerous adjacent dots, can be used to determine the contour of the surface, the edges of the object, and the features of the surface.

In one embodiment, the projector is arranged to project approximately 40,000 dots onto the working area of the table. In such an embodiment, the table can be approximately 450 millimeters by 450 millimeters. In another embodiment, the projector can project a number of high intensity dots dispersed randomly or systematically throughout the plurality of dots. Such high intensity dots can be easily identified in a captured image and can be used to index the plurality of dots on the images captured by the first and second cameras. In another embodiment, the distance of the projector from the table is between about 0.4 meters and 0.5 meters. At such a distance, the projected dots are about 300 microns in diameter.

In another embodiment, the projector can be secured to the end of a robotic arm and can be moved relative to the object when it projects dots onto the object. Such an arrangement can increase the surface area of the object inspected and can gather information and data on the sides of an object as well as the top of the object. Such an arrangement can further be used to secure multiple images of any surface of the object thus, increasing the information and data on that surface, which can further increase accuracy of any determinations of the object's dimensions and contours. As described herein, other known factors that can be incorporated into an analysis are the location and angle of the projector on the robotic arm and how that location and angle changes as the robotic arm moves to alter projections of optical indicators on the object. In another embodiment, the projector can first project a template of the outline of the object to be analyzed. The object can be placed on the template to insure that it is positioned optimally on the table during the gathering of information and data.

Figure 3:
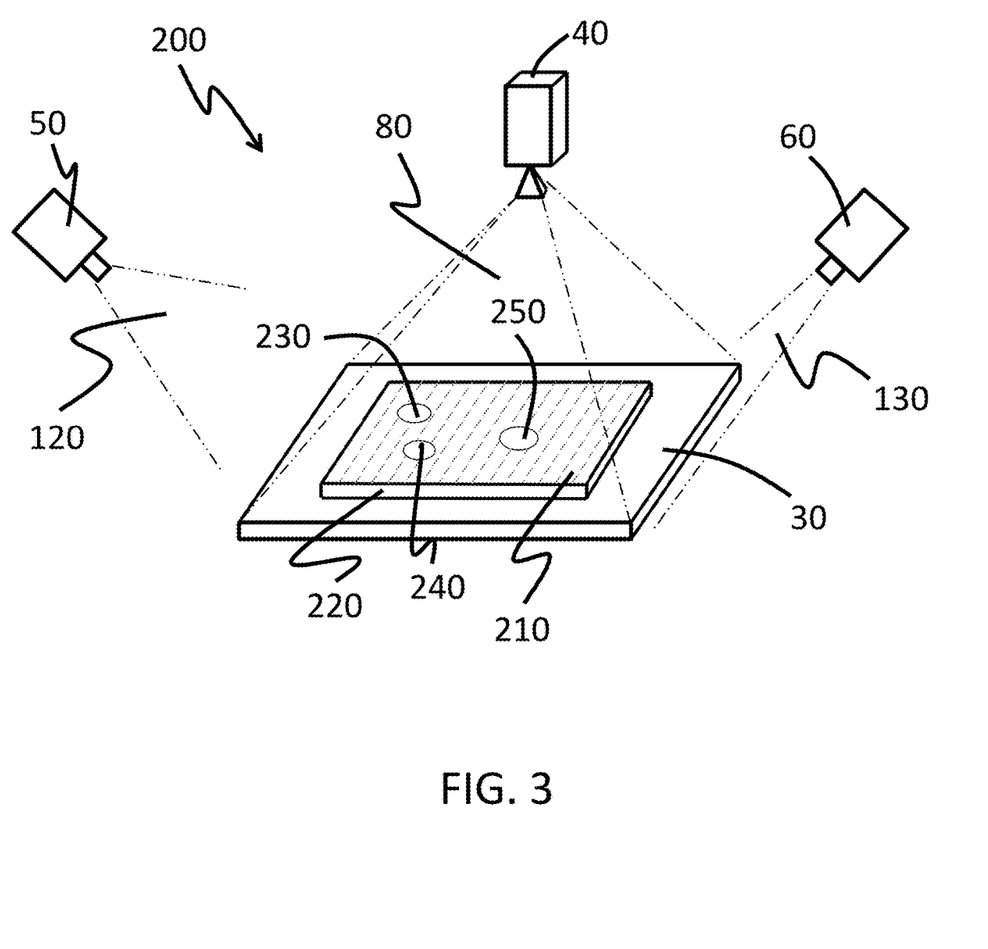
FIG. 3 schematically illustrates a perspective view of another exemplary system for gathering information and data on the surface characteristics of an object using generally parallel linear optical indicators.

FIG. 3 schematically illustrates a perspective view of another system 200 for gathering information and data on surface characteristics of an object 20. The system 200 of FIG. 3 is similar to the system 10 of FIGS. 1 and 2; however, the optical indicators are a series of parallel lines 210. The table 30, projector 40, first camera 50, and second camera 60 are each positioned as illustrated in system 10 of FIGS. 1 and 2 and previously described herein. The object 220 in FIG. 3 includes three holes 230, 240, 250. A first image captured by the first camera 50 and a second image captured by the second camera 60 can be used to determine the location and dimensions of the holes 230, 240, 250 in the object 220. Breaks in the parallel lines 210 can indicate the edge of a hole. In one embodiment, the lines 210 can be projected a number of times at different locations across the table 30, and the first and second cameras 50, 60 can capture an image at each different location. All the captured images can be considered collectively to determine the location and size of the holes 230, 240, 250.

Figure 4:
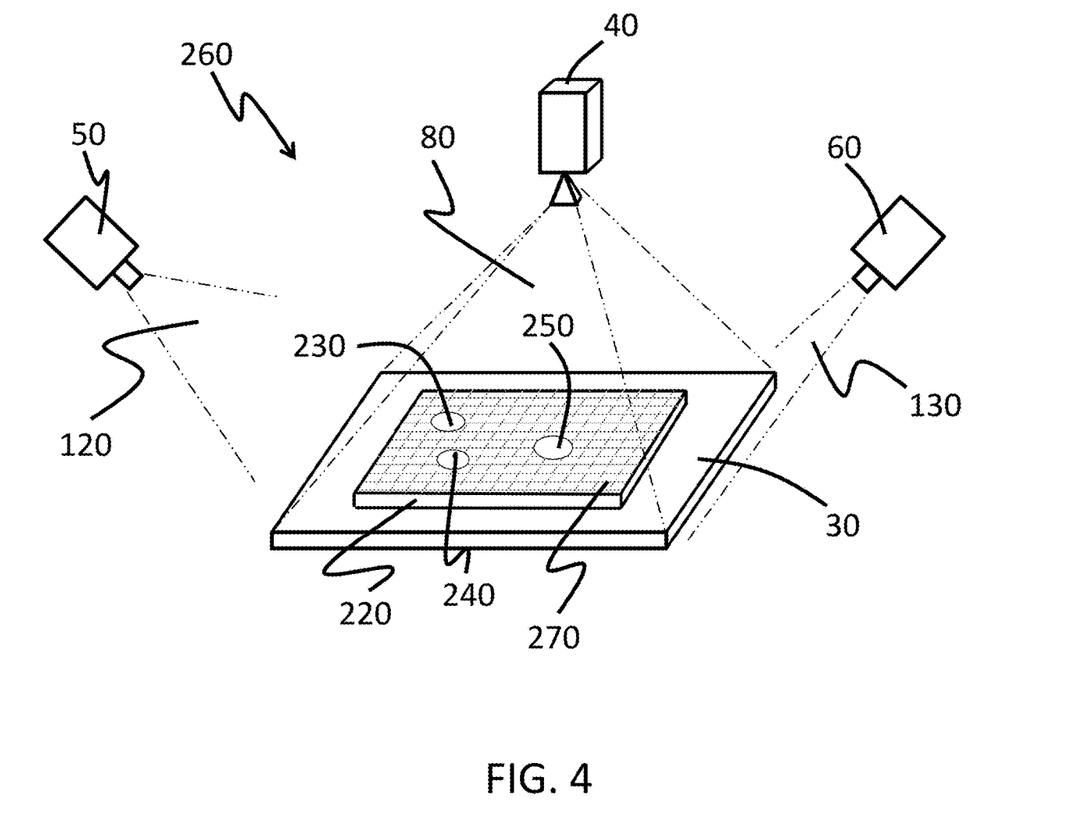
FIG. 4 schematically illustrates a perspective view of yet another exemplary system for gathering information and data on the surface characteristics of an object using a first set of generally parallel linear optical indicators and a second set of generally parallel linear optical indicators that are generally perpendicular to the first set of linear optical indicators.

FIG. 4 schematically illustrates a perspective view of another system 260 for gathering information and data on surface characteristics of an object 20. The system 260 of FIG. 3 is similar to the system 200 of FIG. 3; however, the optical indicators are two series of parallel lines 270, where the first series of parallel lines is perpendicular to the second series of parallel lines. The table 30, projector 40, first camera 50, and second camera 60 are each positioned as illustrated in system 200 of FIG. 3.

Figure 5:
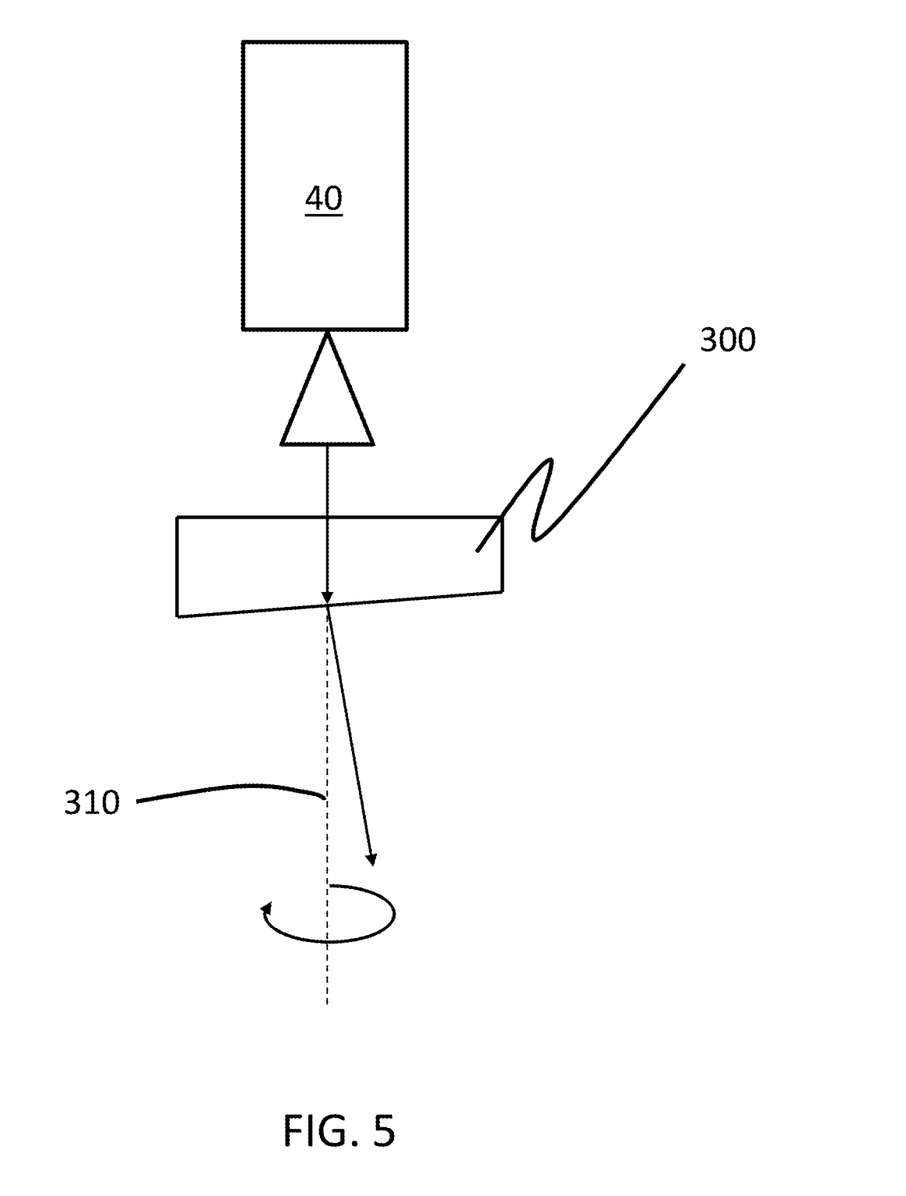
FIG. 5 schematically illustrates an optical wedge positioned proximate to a projector for use with systems disclosed herein.

FIG. 5 illustrates another embodiment in which a rotating optical wedge 300 is positioned between the projector 40 and an object (not illustrated, but similar to the object illustrated in FIGS. 1-4). Such an arrangement facilitates determination of the surface characteristics of the object through capturing multiple consecutive images of the object. In such an arrangement, the projector 40 projects the optical indicators, such as a series of dots, through the optical wedge 300, which refracts the series of dots before projecting the dots onto the object. As the wedge rotates about the axis 310, the series of dots shift position on the object and provides additional information as the dots fall differently on the various contours, features, and edges of the surface of the object. The optical wedge 300 can be rotated and indexed by a motor and belt assembly (not illustrated). This is to say that the optical wedge 300 can be rotated a number of times, each time it is rotated a specific angular increment. With each rotation, the first and second cameras capture an image of the dots on the object. With the angular increment known, this information can be combined with the information and data gathered from the multiple captured images and other known factors to accurately and precisely determine the surface characteristics of the object.

In one embodiment, the angular increment of rotation of the optical wedge 300 is approximately 2 degrees. The optical wedge 300 can be rotated in about 100 milliseconds, and the first and second cameras capture images for each rotation in about one second. In such an arrangement, typically five captured sets of images are sufficient to accurately and precisely determine the surface characteristics of an object. Therefore, the process of determining surface characteristics is efficient.

Figure 6:
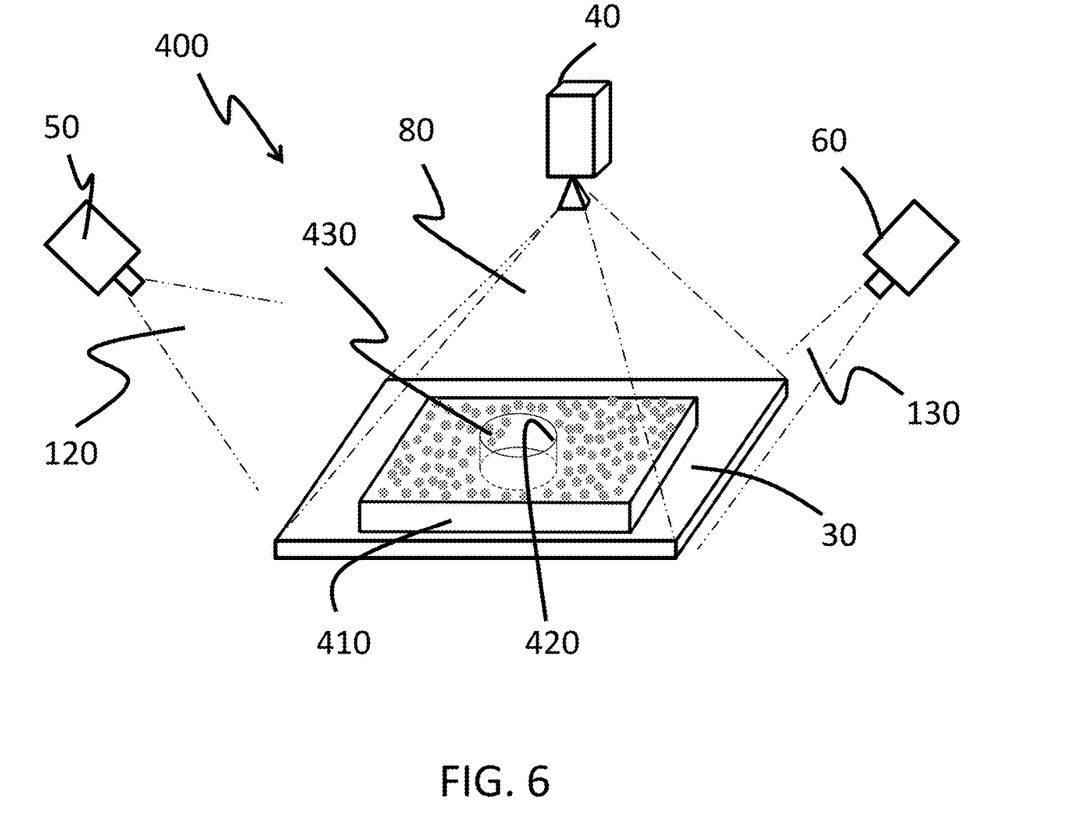
FIG. 6 schematically illustrates a perspective view of another exemplary system for gathering information and data on the surface characteristics of an object, specifically for determining the depth of a hole in the surface of the object.

FIG. 6 schematically illustrates a perspective view of another system 400 for gathering information and data on surface characteristics of an object 410, and specifically the location and dimensions of a hole 420 including the depth of the hole 420. The system 400 includes a table 30, projector 40, first camera 50, and second camera 60. In this embodiment, the dots are projected at a slight angle relative to the table 30. As is illustrated, this results in a series of dots 430 projected on the wall of the hole 420. If the hole is formed through the complete thickness of the object or if the hole is a countersunk hole (i.e., the hole is formed such that it does not go through the entire thickness of the object), the dots 430 can also be projected through the hole or onto the floor of the hole. The second camera 60 can capture the dots 430 projected on the wall of the hole 420 or the floor of a countersunk hole. From the captured image and the known factors of the position and angle of the projector 40, characteristics of the hole 420, including depth, can be determined.

Figure 7:
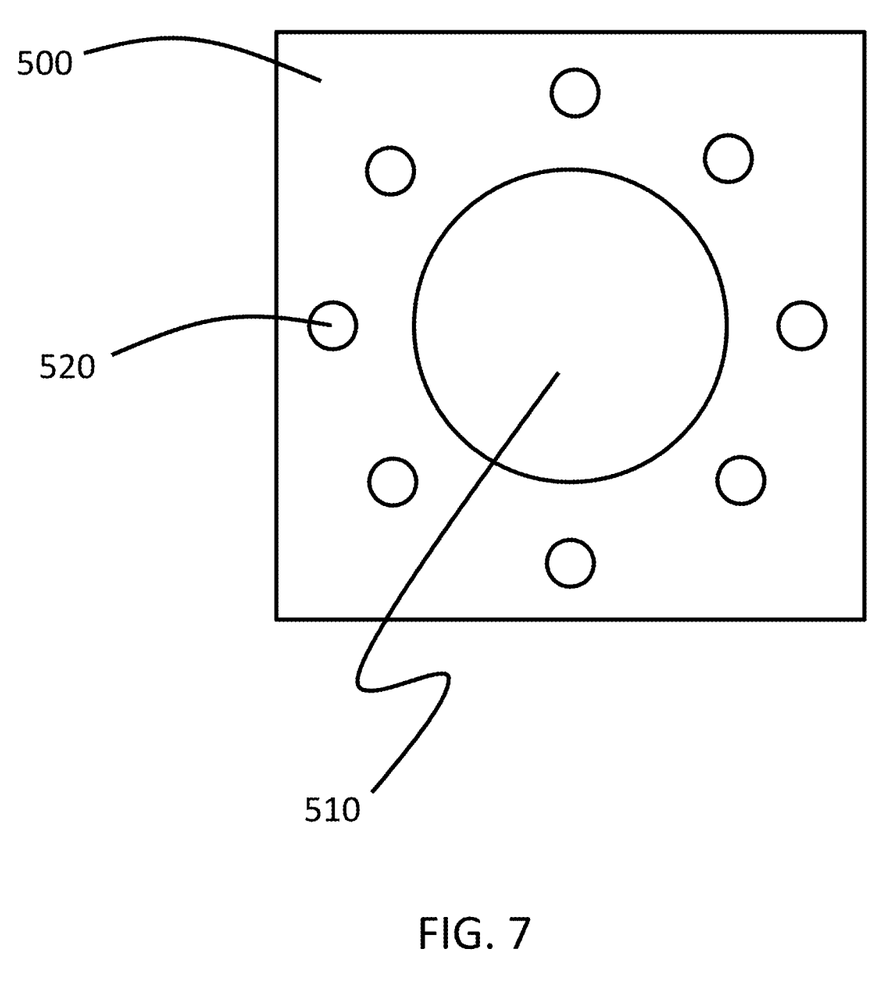
FIG. 7 schematically illustrates a front view of a camera for use with systems disclosed herein.

FIG. 7 schematically illustrates an embodiment of a camera 500. The camera 500 includes an aperture 510 surrounded by a series of light sources 520. The light sources 520 can enhance the quality and detail of images captured by the camera 500. In one embodiment, the light sources are light emitting diodes (LED).

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A system for gathering information and data on the surface characteristics of an object, the system comprising:
   a table arranged to support the object;
   a projector suspended above the table and arranged to project a pattern of optical indicators toward the table;
   an optical wedge positioned between the projector and the table, the optical wedge comprising:
      a first surface; and
      a second surface spaced apart from the first surface and positioned at an angle as compared to the first surface;
   a first camera positioned above and to one side of the table and angled toward the table and arranged to capture optical indicators projected through the optical wedge and onto the object; and
   a second camera positioned above and to opposite side of the table and angled toward the table and arranged to capture optical indicators projected through the optical wedge and onto the object;
   wherein, the system is further arranged to gather information and data from the captured images and determine the surface characteristics of the object from said gathered information and data wherein the optical indicators are randomly distributed dots; wherein the optical wedge is arranged to periodically rotate about an axis; wherein the optical wedge refracts the projection of the pattern of optical indicators.

2. The system of claim 1, wherein the optical wedge is positioned proximate to the projector, with the first surface facing the projector.

3. The system of claim 1, wherein each rotation of the optical wedge is approximately a rotational angle of two degrees.

4. The system of claim 3, wherein the optical wedge is arranged to rotate approximately every 100 milliseconds.

5. The system of claim 4, wherein the first camera and second camera are arranged to capture an image between each rogation of the optical wedge.

6. A system for gathering information and data on the surface characteristics of an object, the system comprising:
   a table arranged to support the object;
   a projector suspended above the table and arranged to project a pattern of optical indicators toward the table in a field of projection;
   an optical wedge positioned proximate to the projector in the field of projection and arranged to periodically rotate about an axis of the field of projection, the optical wedge comprising:
      a first surface, generally perpendicular to the axis; and
      a second surface spaced apart from the first surface and positioned at an angle to the axis;
   a first camera positioned above and to one side of the table and angled toward the table and arranged to capture images of the optical indicators projected onto the object as the optical wedge rotates; and
   a second camera is positioned above and to opposite side of the table and angled toward the table and arranged to capture images of the optical indicators projected onto the object as the optical wedge rotates;
   wherein, the system is further arranged to gather information and data from the captured images and determine the surface characteristics of the object from said gathered information and data wherein the optical indicators are randomly distributed dots; wherein the optical wedge refracts the projection of the pattern of optical indicators.

7. The system of claim 6, wherein the optical wedge is positioned such that the first surface is facing the projector.

8. The system of claim 6, wherein each rotation of the optical wedge is approximately a rotational angle of two degrees.

9. The system of claim 8, wherein the optical wedge is arranged to rotate approximately every 100 milliseconds.

10. The system of claim 9, wherein the first camera and second camera are arranged to capture an image between each rogation of the optical wedge.

* * * * *